US012708101B2

(12) United States Patent
Wimmer, IV

(10) Patent No.: US 12,708,101 B2
(45) Date of Patent: Aug. 18, 2026

(54) COLLAR HAVING INCLUDED TAG ASSEMBLY

(71) Applicant: Road ID, Inc., Covington, KY (US)

(72) Inventor: Edward Michael Wimmer, IV, Lakeside Park, KY (US)

(73) Assignee: Road ID, Inc., Covington, KY (US)

(*) Notice: Subject to any disclaimer, the term of this patent is extended or adjusted under 35 U.S.C. 154(b) by 0 days.

(21) Appl. No.: 18/913,373

(22) Filed: Oct. 11, 2024

(65) Prior Publication Data

US 2026/0101869 A1 Apr. 16, 2026

(51) Int. Cl.
*A01K 11/00* (2006.01)
*A01K 27/00* (2006.01)

(52) U.S. Cl.
CPC ............ *A01K 11/00* (2013.01); *A01K 27/001* (2013.01)

(58) Field of Classification Search
CPC .. A01K 11/006; A01K 27/009; A01K 27/001; A01K 27/002; A01K 27/003; A01K 27/005; A01K 27/006; G09F 3/005; G09F 3/18
See application file for complete search history.

(56) References Cited

U.S. PATENT DOCUMENTS 3,585,743 A 6/1971 Jeffers
4,174,553 A * 11/1979 Schrougham ........ A44B 11/226 24/321
4,218,991 A * 8/1980 Cole .................... A01K 27/007 119/858
4,309,797 A * 1/1982 Schrougham ........ A44B 11/226 40/303
5,092,067 A * 3/1992 Prout .................. A44C 5/0015 40/633

(Continued)

FOREIGN PATENT DOCUMENTS

CN 304358501 11/2017
DE 402017000092.6 2/2017

(Continued)

OTHER PUBLICATIONS

Road iD _ Official Identification Bracelet—posted Sep. 5, 2018—retrieved Oct. 9, 2025_ Retrieved from Internet _ https:// www.amazon.com/dp/B07H43TGBW/ref=sspa_dk_detail_ 1? (Year: 2018).

(Continued)

*Primary Examiner* — Trinh T Nguyen
(74) *Attorney, Agent, or Firm* — Sand, Sebolt & Wernow Co., LPA

(57) ABSTRACT

A collar apparatus comprises a belt, an identification tag selectively operatively engageable with the belt, the identification tag comprising: an outer plate that engages with an outer face of the belt; and an inner plate that engages with an inner face of the belt; wherein the identification tag encapsulates at least a portion of the belt. An identification tag for an animal collar comprises: a front plate; a rear plate operatively engageable with the front plate; at least one connector releasably engaging the front plate with the rear plate on a belt of the animal collar; wherein at least a portion of the belt is encapsulated between the front plate and the rear plate.

8 Claims, 13 Drawing Sheets

(56) References Cited

U.S. PATENT DOCUMENTS

| | | | | |
|---|---|---|---|---|
| 5,355,839 | A * | 10/1994 | Mistry | A01K 27/009 119/858 |
| 5,781,980 | A | 7/1998 | Golston | |
| 5,818,354 | A | 10/1998 | Gentry | |
| 5,955,953 | A * | 9/1999 | Hanson | A01K 11/00 340/573.3 |
| 6,283,065 | B1 * | 9/2001 | Shorrock | A01K 27/001 119/859 |
| 6,374,778 | B1 * | 4/2002 | Glussich | A01K 11/00 119/859 |
| 6,422,177 | B1 * | 7/2002 | Noguero | A01K 27/006 119/858 |
| 6,745,508 | B1 | 6/2004 | Ngan | |
| 7,225,761 | B2 | 6/2007 | Reilly | |
| 7,421,980 | B1 * | 9/2008 | Ehlers | A01K 27/006 119/858 |
| D660,913 | S | 5/2012 | Podd | |
| D669,079 | S | 10/2012 | Hansen | |
| D797,193 | S * | 9/2017 | Csenar | D20/27 |
| D925,141 | S | 7/2021 | Lai | |
| D932,450 | S | 10/2021 | Ishikawa | |
| D932,712 | S | 10/2021 | Mott et al. | |
| D1,040,450 | S * | 8/2024 | East | D10/104.1 |
| 2005/0087150 | A1 | 4/2005 | Reilly | |
| 2005/0263106 | A1 * | 12/2005 | Steinbacher | A01K 27/006 119/858 |
| 2008/0263920 | A1 * | 10/2008 | Trigg | G09F 3/08 40/299.01 |
| 2009/0188442 | A1 * | 7/2009 | Dawe | A01K 27/006 119/858 |
| 2010/0277943 | A1 * | 11/2010 | Hurwitz | A44C 1/00 362/570 |
| 2013/0074544 | A1 | 3/2013 | Lans | |
| 2014/0070012 | A1 | 3/2014 | Hunt et al. | |
| 2017/0265432 | A1 | 9/2017 | Anderton et al. | |

FOREIGN PATENT DOCUMENTS

| | | |
|---|---|---|
| GB | 4012179 | 9/2009 |
| GB | 8080216000-1000 | 12/2012 |
| KR | 3010223090000 | 9/2019 |
| KR | 3020210056443 | 1/2023 |
| KR | 3020230014526 | 2/2024 |
| KR | 3020240040704 | 8/2025 |

OTHER PUBLICATIONS

Road iD_ The Rock Solid Collar ID_—posted Feb. 19, 2021—retrieved Oct. 9, 2025_ Retrieved from Internet _ https://www.amazon.com/-/he/m,111-!rn1>rn7-m•jJ-Rock-J.1E>'IJ/dp/B08WXFSZBS?th=1 (Year: 2024).

Road ID_Bracelet—Official ID Wristband—posted Mar. 9, 2016—retrieved Oct. 9, 2025_ Retrieved from Intermet_https://www.amazon.com/dp/B01CRAYX9Y/ref=sspa_dk_detail_1 (Year: 2016).

Universal Medical Data_No Blind NG Tubes No NSAIDS_posted Feb. 6, 2018—retrieved Oct. 9, 2025_ Retrieved from Internet_ https://www.amazon.com/dp/B018N6G4O8/ref=sspa_dk_detail_3?th=1(Year: 2018).

Divoti_Custom Engraved Medical Alert_ID Bracelet_posted Nov. 18, 2019—retrieved Oct. 9, 2025_Retrieved from Internet https://www.amazon.com/dp/B0824S5LR3/ref=sspa_dk_detail_0?th=1&psc=1 (Year: 2019).

Breck ID_Sprint Medical Alert Bracelet_for Men and Women_ posted Dec. 6, 2022—retrieved Oct. 9, 2025_Retrieved from Intemet_ https://www.amazon.com/dp/BOBP7TDZWJ/ref=sspa_dk_detail_1?th=1 (Year: 2022).

DogID_Instagram_Is your dogs collar a clinking_ Jul. 27, 2024—retrieved Oct. 9, 2025_ Retrieved from Internet_https://www.instagram.com/p/C97akqDuxjL/ (Year: 2024).

DogID_Instagram_Maggie a service dog in training_posted Sep. 24, 2024—retrieved Oct. 9, 2025_ Retrieved from Intermet_https://www.instagram.com/p/DATcPYQgtXN/ (Year: 2024).

DogID_Instagram_Thats the smile of a pup_with total peace of mind posted Jul. 25, 2024—retrieved Oct. 9, 2025_Retrieved from Intermet https://www.instagram.com/p/C92Z_zEJo_6/ (Year: 2024).

Theluckytag_Upgraded Medical Bracelets_Men Women with QR Code—posted Aug. 23, 2024—retrieved Oct. 9, 2025_Retrieved from Intemet https://www.amazon.com/dp/B0CH38N6NP/ref=sspa_dk_detail_2?th=1 (Year: 2024).

Breck—Sprint ID Tag—Installation—https://breckid.com/pages/sprint-id-tag-installation—Retrieved from Internet _ retrieved Feb. 9, 2026.

* cited by examiner

FIG. 13
36c
36d
36e
FLUFFY
NEEDS MEDICINE XYZ
TWICE PER DAY
PH- 345-678-9012
24

COLLAR HAVING INCLUDED TAG ASSEMBLY

TECHNICAL FIELD

This disclosure is directed to animal collars. More particularly, this disclosure is directed to animal collars having an identification purpose. Specifically, this disclosure is directed to animal collars having a customizable identification tag that encapsulates a portion of a belt of the animal collar.

BACKGROUND ART

Existing animal collars, in particular animal collars, such as dog- and cat-collars, have been in use for many years, their purpose being to identify the animal and its owner. Such animal-collars are typically a stamping of a base metal affixed to a collar with a keychain or similar connector. Such connectors are typically weak and easily breakable.

SUMMARY OF THE INVENTION

In one aspect, an exemplary embodiment of the present disclosure may provide a collar apparatus comprising a belt; an identification tag selectively operatively engageable with the belt, the identification tag comprising: an outer plate that engages with an outer face of the belt; and an inner plate that engages with an inner face of the belt; wherein the identification tag encapsulates at least a portion of the belt. The identification tag may comprise a sight on which markings can be made on an outward face thereof. The identification tag may comprise markings on the sight. The identification tag may comprise at least one connector. The at least one connector may engage the inner plate, the belt, and the outer plate. The outer plate may define at least one notch therein. The inner plate may define at least one flange therein. The at least one flange may engage with the at least one notch.

In another aspect, the disclosure provides a method of assembling an identification tag to a collar, the method comprising: providing an elongated belt having a first face and a second face; providing an identification tag comprising at least a first plate; providing at least one connector; engaging the first plate with the first face of the elongated belt; and engaging the at least one connector with the first plate and elongated belt to removably attach the first plate and elongated belt to one another. In this exemplary embodiment or another exemplary embodiment, the method further comprises: engaging a second plate of the identification tag with the second face of the elongated belt such that the elongated belt lies between the first and a second plate. In this exemplary embodiment or another exemplary embodiment, first plate defines at least one notch and the second plate comprises at least one flange, wherein the at least one notch and at least one flange are configured to couple together. In this exemplary embodiment or another exemplary embodiment, the at least one connector is at least one screw. In this exemplary embodiment or another exemplary embodiment, the method further comprises: applying torque to the at least one screw to engage and affix the at least one screw to the first and second plates and the elongated belt.

In yet another aspect, the disclosure provides an identification tag for an animal collar comprising: a front plate; a rear plate operatively engageable with the front plate; at least one connector releasably engaging the front plate with the rear plate on a belt of the animal collar; and wherein at least a portion of the belt is encapsulated between the front plate and the rear plate.

In this exemplary embodiment or another exemplary embodiment, the front plate and the rear plate are generally curved rectangular plates that, when coupled together, form a curved rectangular cuboid configuration for the identification tag.

In this exemplary embodiment or another exemplary embodiment, when the front plate and the rear plate are coupled together they collectively define a channel, and the belt extends through the channel surrounded by the identification tag.

In this exemplary embodiment or another exemplary embodiment, the front plate defines at least one threaded aperture operatively engageable with the at least one connector, wherein the aperture is formed in a rear surface of the front plate. In this exemplary embodiment or another exemplary embodiment, the rear plate includes at least one through-aperture that receives the at least one connector therethrough to connect the rear plate to the front plate. In this exemplary embodiment or another exemplary embodiment, the connector extends transversely through the belt. In this exemplary embodiment or another exemplary embodiment, the front plate further comprises: front and back major faces; upper and lower projections; and left and right edge pillars; wherein the rear plate further comprises: front and back major faces; and upper and lower flanges.

In another aspect, the disclosure provides an identification tag for an animal collar comprising: a front plate; a rear plate operatively engageable with the front plate; at least one connector releasably engaging the front plate with the rear plate on a belt of the animal collar; wherein at least a portion of the belt is encapsulated between the front plate and the rear plate. The identification tag may further comprise at least one identifier defined in a front or rear plate. The identifier may comprise information about an animal and/or its owner. The front plate may include at least one aperture operatively engageable with the at least one connector. The rear plate may include at least one aperture operatively engageable with the at least one connector. The connector is capable of piercing the belt. Flanges defined in the front plate may engage with notches in the rear plate. The belt may comprise at least one connector at a first end thereof that is capable of fastening the first end of the belt to a second end of the belt.

In yet another aspect, the disclosure provides a method of identifying an animal comprising: providing an elongate belt having a first face and a second face, providing the identification tag comprising at least a first plate; providing at least one connector; engaging the first plate with the belt first face; engaging the at least one connector with the first plate and belt to removably attach said first plate and belt to one another; and affixing the collar to the animal.

In still another aspect, the disclosure provides an identification tag for an animal collar comprising: a first plate comprising: front and back major faces; upper and lower projections; and left and right edge pillars; a second plate comprising: front and back major faces; and upper and lower flanges. The identification tag may further comprise: a belt that operatively engages: a major face of the first plate; and a major face of the second plate. The identification tag may further comprise: a writing on at least one of the major face of the first plate or the major face of the second plate.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
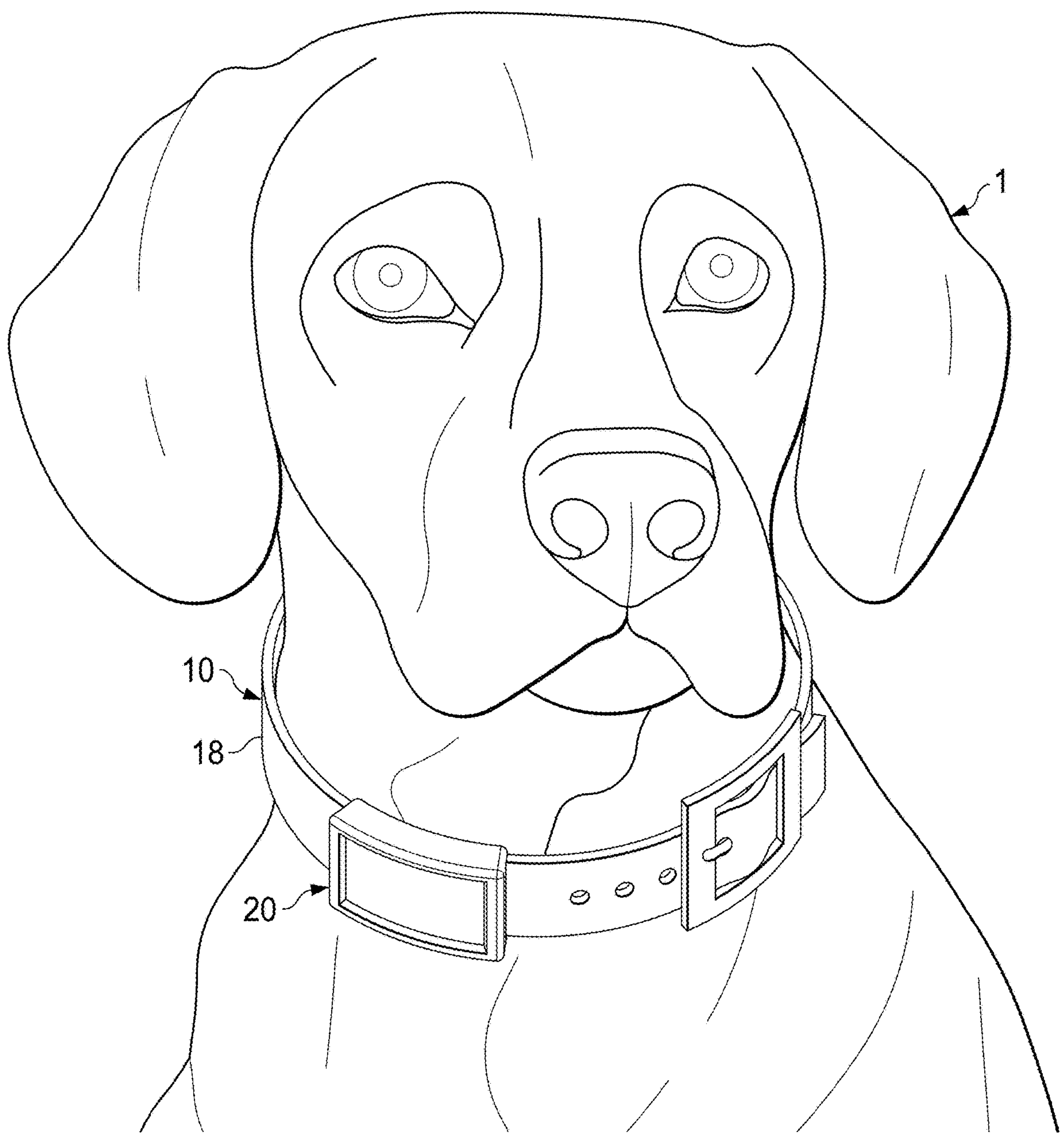
FIG. 1 is an operational view of a collar in accordance with one aspect of the present disclosure being worn by an animal, the collar having a belt and an identification tag.

In FIG. 1, an animal 1, wearing the collar 10 of the present disclosure, is depicted. The collar includes a belt 18 and an identification tag 20 that operably engages with the belt 18 in which the identification tag 20 encapsulates and/or surrounds a portion of the belt. Although a dog is shown as animal 1, it will be appreciated that any animal, whether typically a domesticated animal or feral animal (wolf, goat, pig) can take the place of animal 1.

In one embodiment, belt 18 and tag 20 could be useful for humans in other forms, such as an identification bracelet and other forms of identification that could be worn by humans.

Figure 2:
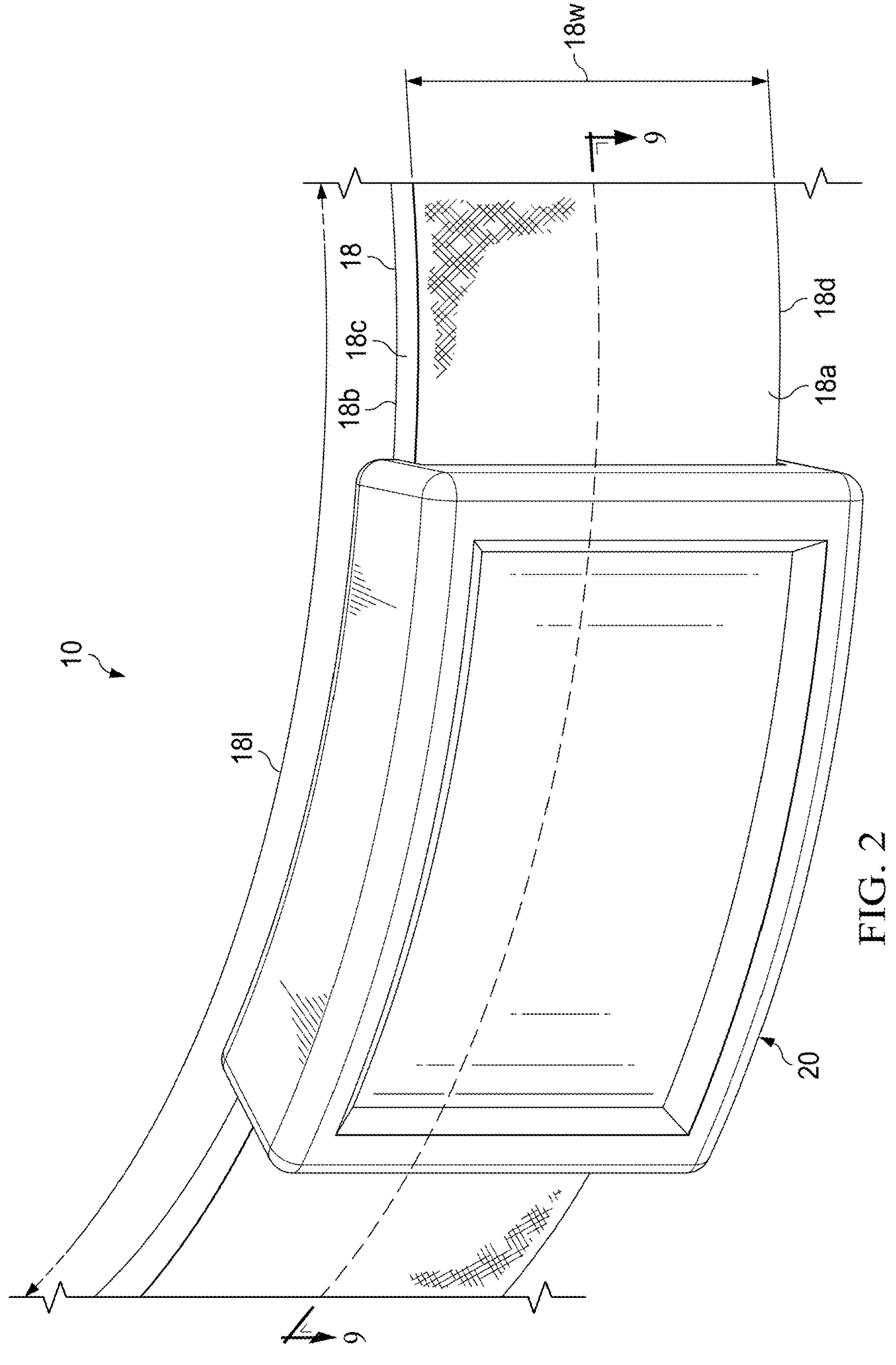
FIG. 2 is a partial front perspective view of the collar of shown in FIG. 1.

A belt 18 can be made of, for example, cloth, nylon, polyester or other polymer, fabric, denim, woven twine or leather. As best seen in FIG. 2, belt 18 has an outer face 18*a* that faces in a first direction away from animal 1 when belt 18 is worn by said animal 1, and an inner face 18*b* that faces in a second direction towards animal 1 when belt 18 is worn by said animal 1. In the shown embodiment, the outer face 18*a* is flat, planar and largely uninterrupted over its surface. However, other embodiments may provide a belt 18 with an outer face 18*a* that is texturized or decorated with other features. Typically, the inner face 18*b* will remain flat, planar and largely uninterrupted across its surface as it should remain comfortable for the animal 1 to wear. Belt 18 also has a first edge 18*c* that extends between the outer face 18*a* and the inner face 18*b*, and a second edge 18*d* that extends between the outer face 18*a* and the inner face 18*b* and is opposite to the first edge 18*c*. Although edges 18*c* and 18*d* are termed "edges" herein, it will be appreciated that such edges have two dimensions, that is, a discernible area defined by the thickness of the belt 18 between outer face 18*a* and the inner face 18*b*, in contrast to the strict definition of edge, which has only one dimension, that being length. Belt 18 also defines a length 18*i* that is measured between a first end 18*e* and a second end 18*f* of belt 18, and a width 18*w* that is measured between the first edge 18*c* and the second edge 18*d*.

While belt 18 is not limited in size, in various embodiments, belt 18 may have a length such as 4", 5", 6", 7", 8", 9", 10", 12", 15", 18", 20", or 24" or other lengths depending on the size of animal 1. Alternatively, if the belt 18 is intended to be worn by a human around their waist, then the belt have a length of 24", 26", 28", 30", 32", 34", 36", 38", 40", 42", 44" or more. Belt 18 may have various widths, including, for example, ½", ¾", ⅞", 1", 1¼" 1½" or 2" or other widths depending on the size of animal 1. Belt 18 may also have various thicknesses; it may be thin enough to fit inside identification tag 20 yet thick enough to bear the weight of identification tag 20 and stand up to wear and tear by the animal wearing it, for example, ⅛", ¼", ½", ¾", ⅞", or 1" or other widths depending on the size of animal 1.

Figure 3:
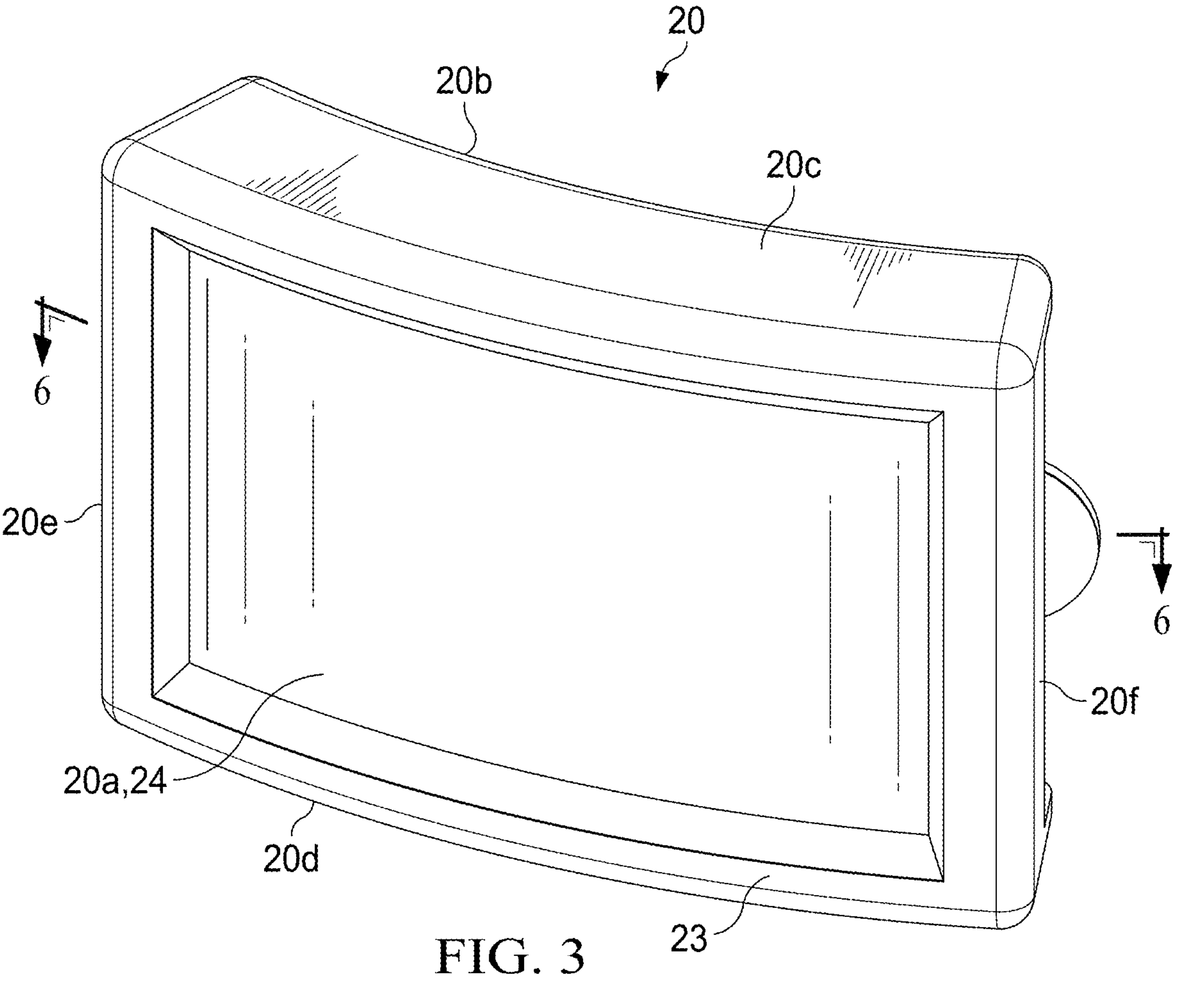
FIG. 3 is a left, top, front isometric perspective view of the identification tag of the disclosure.

As seen in FIG. 3, in one embodiment, the identification tag 20 is arcuate, and generally rectangular. However, the identification tag 20 need not be arcuate, that is, it may be substantially flat or planar. The identification tag 20 is conceptually a cuboid or an arcuate cuboid. This means that the identification tag 20 is broadly defined by six faces, eight vertices and twelve edges. The identification tag 20 has two opposing major faces 20*a* and 20*b*, and four minor faces, divided into two opposing pairs, 20*c* opposed to 20*d* and 20*e* opposed to 20*f*. The first major face 20*a* and second major face 20*b* may for convenience be termed "front face 20*a*" and "back face 20*b*," respectively. The first minor face 20*c* and second minor face 20*d* may for convenience be termed "top face 20*c*" and "bottom face 20*d*," respectively. Finally, the third minor face 20*e* and fourth minor face 20*f* may for convenience be termed "left face 20*e*" and "right face 20*f*," respectively. Such directional terms are purely exemplary, relative, and not limiting.

Figure 4:
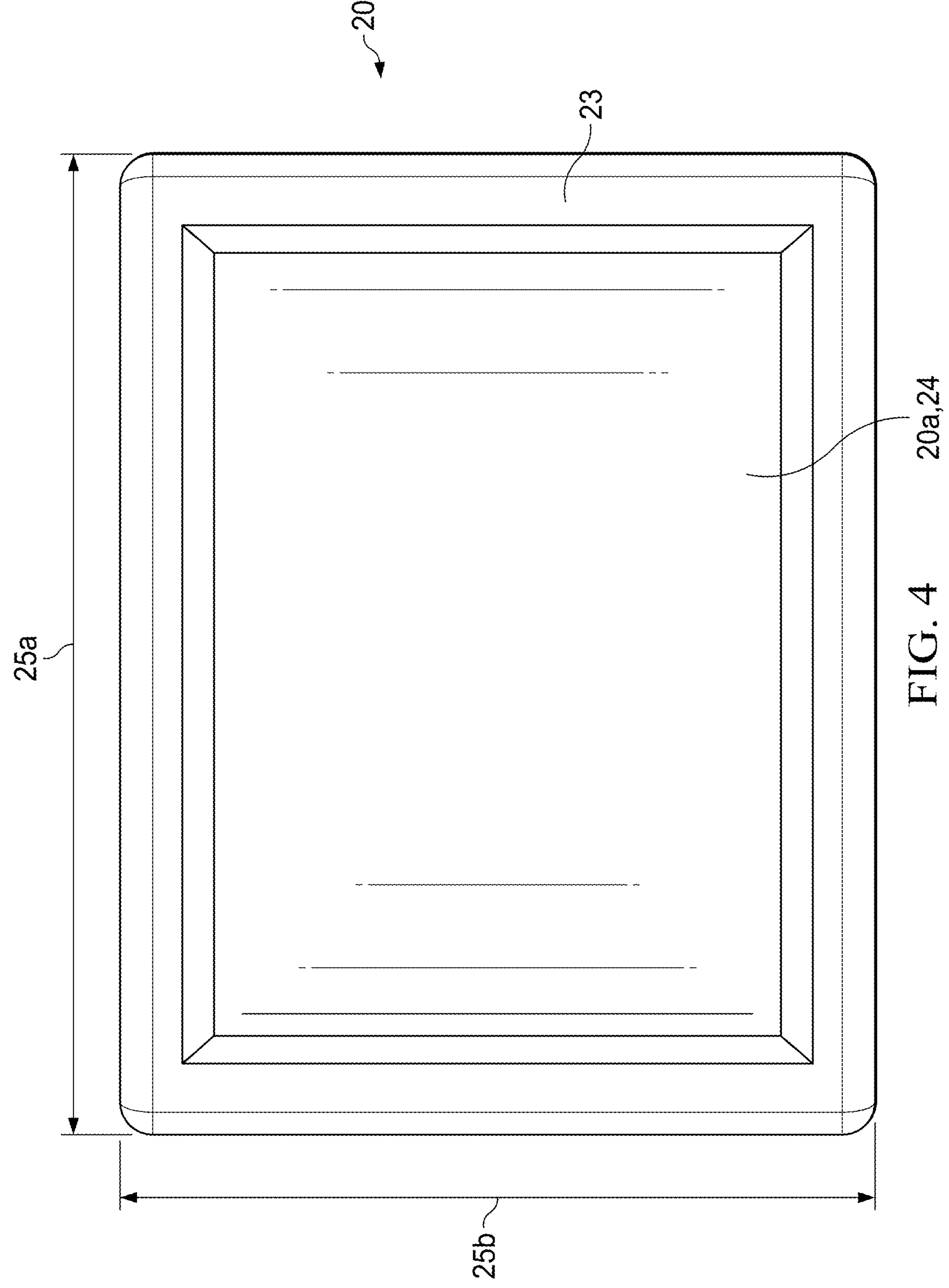
FIG. 4 is a front elevation of the identification tag of the disclosure.

In further detail, referring to FIG. 3, identification tag 20 has a frame 23 and an identification area or sight 24 on front face 20*a*. Frame 23 and sight 24 are generally parallel to one another. In the context of an identification tag 20 that is arcuate, "parallel" means that the curvature of frame 23 is substantially the same as that of sight 24. In other words, it can be conceptualized as two planes having the same curvature as applied from two parallel axes. In the present disclosure, sight 24 is an area within which markings, or other identifiers or indicia such as the name of an animal or owner may be engraved, stamped, or defined in the sight 24. Identification tag 20 also includes a connecting wall or lateral wall 24*a* that extends between the frame 23 and the sight 24. As best seen in FIG. 4, sight 24 and lateral wall 24*a* also collectively define a recess or cavity 24*b* in front face 20*a* such that the sight 24 is offset from the front face 20*a*. Such offset of the sight 24 may be advantageous at least because external elements in which the animal 1 experiences (e.g., bushes, brush, and other vegetation) such markings or identifiers defined in the sight 24 may be less likely to contact sight 24 thus reducing the chances of marring and reducing the legibility of the markings or identifiers defined in the sight 24.

FIG. 4 is a front plan view of identification tag 20 showing dimensions of identification tag 20. In particular, width 25*a* of identification tag 20 runs generally parallel to length 181 of belt 18, which is generally horizontal as worn by animal 1. Height 25*b* of identification tag 20 runs generally parallel to width 18*w* of identification tag 20, which is generally vertical as worn by animal 1. Width 25*a* of identification tag 20 may be, in various embodiments, 0.25", 0.5", 0.75", 1", 1.25", 1.5", 1.75", 2" or other widths in between. Heights 25*b* of identification tag 20 may be, in various embodiments, 0.25", 0.5", 0.75", 1", 1.25", 1.5", 1.75", 2" or other widths in between.

FIGS. 5A and 5B are exploded rear perspective views of identification tag 20 depicting that identification tag 20 is made up of a front piece 26 (see FIG. 5A) and an opposing back piece 27 (see FIG. 5B). Based on the structural configuration of identification tag 20, front piece 26 and back piece 27 are separable from one another and may be assembled with one another by fasteners 28. Front piece 26 and back piece 27 are arcuate in the depicted embodiment, however other shapes are possible.

Figure 5:
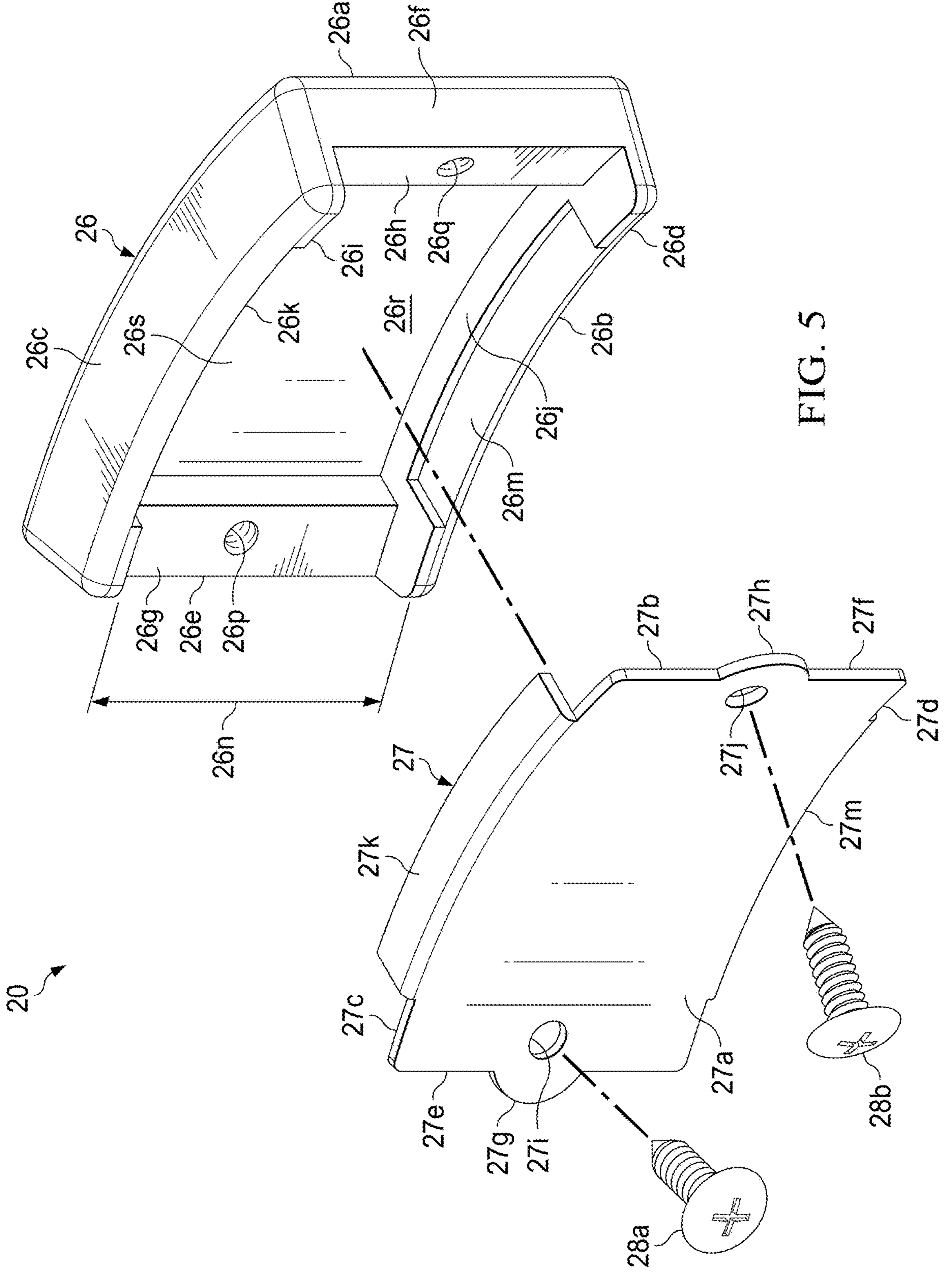
FIG. 5 is an exploded view of the identification tag of the disclosure.

With respect to front piece 26, the front piece 26 has outer side 26*a* which coincides with front face 20*a* and frame 23 and defines sight 24 (see FIG. 3). Front piece 26 also includes an inner side 26*b* that is opposite to outer side 26*a*. Front piece 26 also includes a top end 26*c* of front piece 26. Front piece 26 also includes a bottom end 26*d* that is opposite to top end 26*c*. Front piece 26 also includes a pair of edge pillars 26*e* and 26*f* that extend outwardly from the inner side 26*b* of front piece 26 and are positioned between the top end 26*c* and bottom end 26*d* of front piece 26. Edge pillar 26*e* includes a first inner vertical wall 26*g*, which is inward facing, and edge pillar 26*f* includes a second inner vertical wall 26*h*, which is inward facing. As shown in FIG. 5, given that front piece 26 and back piece 27 are arcuate, the first and second inner vertical walls 26*g* and 26*h* of edge pillars 26*f* and 26*e*, respectively, may also be considered to be part of an arcuate surface with a center portion (not shown) cut away. The outer face of edge pillar 26*e* is minor face 20*f*, while the outer face of edge pillar 26*f* is minor face 20*e* (the latter two items shown in FIG. 3).

Front piece 26 also includes an upper inner face 26*i* and an opposite lower inner face 26*j* that is positioned between the front end 26*a* and the rear end 26*b* (see FIG. 3). As best seen in FIG. 5, the upper inner face 26*i* and the lower inner face 26*j* extend between the pair of edge pillars 26*e*, 26*f* and are vertically opposite to one another. Still referring to FIG. 5, upper inner face 26*i* defines an upper notch 26*k* while the lower inner face 26*j* defines opposing lower notch 26m. In the present disclosure, the upper notch 26*k* and the lower notch 26*m* are aligned with one another along a common axis extending between said notches 26*k*, 26*m*. Such use and purpose of upper notch 26*k* and lower notch 26*m* will be described more fully below.

Front piece 26 also defines a pair of channels 26*n*. As best seen in FIG. 5A, each channel 26*n* is collectively defined between a respective edge pillar 26*e*, 26*f*, a respective vertical wall 26*g*, 26*h* defined along the corresponding edge pillar 26*e*, 26*f*, the upper inner face 26*i*, and the lower inner face 26*j*. Each channel of the pair of channels 26*n* are also aligned with one another along a common axis that extends between the pair of channels 26*n*. As discussed in greater detail below, the pair of channels 26*n* provides a space into which belt 18 may be secured between front piece 26 and back piece 27 when collar 10 is assembled.

More particularly, the second inner vertical wall 26*h*, which is inward facing, on the edge pillars 26*e* and 26*f*, is spaced apart from an inner surface on the back piece 27. As such, when the back piece 27 is mated to the front piece 26, as described in greater detail herein, the channels 26*n* are defined between the vertical wall 26*g* on the edge pillar 26*e* and the wall 26*h* on the edge pillar 26*f*. Each channel 26*n* receives the belt 18 therethrough. As such, one embodiment of the tag 20, which is collectively defined by the front piece 26 and the back piece 27, completely surrounds the belt as the belt passes through the channels 26*n*.

Still referring to front piece 26, edge pillar 26*e* defines a threaded aperture 26*p* and edge pillar 26*f* defines a threaded aperture 26*q*. Threaded apertures 26*p* and 26*q* may be configured to receive a fastener, such as a screw, in order to secure back piece 27 and/or belt 18 to front piece 26.

Still referring to front piece 26, front piece 26 includes an inner base wall 26*r*. As best seen in FIG. 5A, inner base wall 26*r* is internal to the edge pillars 26*e*, 26*f*, upper inner face 26*i*, and lower inner face 26*j* and is forward of the upper notch 26*k*, lower notch 26*m*, and the pair of channels 26*n*. Front piece 26 also defines a central cavity 26*s* that is accessible at rear end 26*b* when the identification tag 20 is disassembled. Particularly, central cavity 26*s* is collectively defined by the edge pillars 26*e*, 26*f*, upper inner face 26*i*, lower inner face 26*j*, and inner base wall 26*r*. In operation, central cavity 26*s* may receive and house a portion of the belt 18 when the belt 18 and the identification tag 20 are assembled with one another to form collar 10.

Back piece 27 as seen in FIG. 5B, includes an outer face 27*a* that faces in a first direction and contacts the animal 1 when collar 10 is assembled, and an outer face 27*a* that faces in a second direction opposite to inner face 27*b*. Outer face 27*a* is free from contacting the animal 1. Back piece 27 also includes an upper edge 27*c* opposing a lower edge 27*d*. Further, back piece 27 includes a left edge 27*e* opposing a right edge 27*f*. In one embodiment, the left edge 27*e* defines a first lobe 27*g*. In another embodiment, right edge 27*f* defines a second lobe 27*h*. First lobe 27*g* defines a first aperture 27*i*, and second lobe 27*h* defines a second aperture 27*j*. In another embodiment, (not shown), back piece 27 may lack lobes 27*g* and 27*h*, however it will still include apertures 27*i* and 27*j*. Back piece 27 also includes a first flange 27*k* that projects from top edge 27*c*. Back piece 27 also includes a second flange (bottom flange) 27*l* that projects from bottom edge 27*d* and is opposite to the first flange 27*k*. Back piece 27 may be arcuate as shown, or flat, or other shapes dictated by the implementation of rear plate 27.

When identification tag 20 is assembled, top flange 27*k* fits into upper notch 26*k* of front piece 26 and engages with the front piece 26 inside of upper notch 26*k*. Similarly, bottom flange 27*l* also fits into lower notch 26*m* and engages with the front piece 26 inside of lower notch 26*m*. Upon assembly, the top and bottom flanges 27*k*, 27*l* and top and lower notches 26*k*, 26*m* fit together tightly to hold a belt 18 in place as shown in FIG. 2. First and second screws 28*a* and 28*b* of tag 20 also pass through first and second apertures 27*g*, 27*h*, respectively, and threadably engage with the front piece 26 at apertures 26*p* and 26*q*. Upon such engagement, first screw 28*a* and second screw 28*b* releasably secure the front piece 26 and the back piece 27 together. It is noted that screws 28*a*, 28*b* also puncture and/or penetrate a portion of the belt 18 when the user secures the front piece 26 and back piece 27 together along a portion of said belt 18 (see FIG.

11); such operation is discussed in greater detail below. It is also noted that apertures 26*p*, 26*q*, 27*g* and 27*h* may or may not be threaded.

In one embodiment, it is possible that flanges 27*k* and 27*l* together with upper notch 26*k* and lower notch 26*m* are so configured that a frictional interference fit between a respective notch and flange (for example flange 27*k* and upper notch 26*k*) forms a sufficiently secure assemblage such that screws 28*a* and 28*b* are not required. However, in one embodiment screws 28*a* and 28*b* are present to fasten back piece 27 to front piece 26 with or without belt 18 therebetween.

In one embodiment, assembly of belt 18 with identification tag 20 may be accomplished by laying belt 18 into channels 26*n*, laying back piece 27 onto belt 18, passing first screw 28*a* through aperture 26*p* of front piece 26 and second screw 28*b* through aperture 26*q* of front piece 26, and screwing in first screw 28*a* into aperture 27*i* of back piece 27 and second screw 28*b* into aperture 27*j* of back piece 27. Belt 18 (made of, for example, cloth, nylon, polymer, woven cloth, leather or other fabric) can easily be penetrated by screws 28*a*, 28*b* as previously discussed above.

Figure 6:
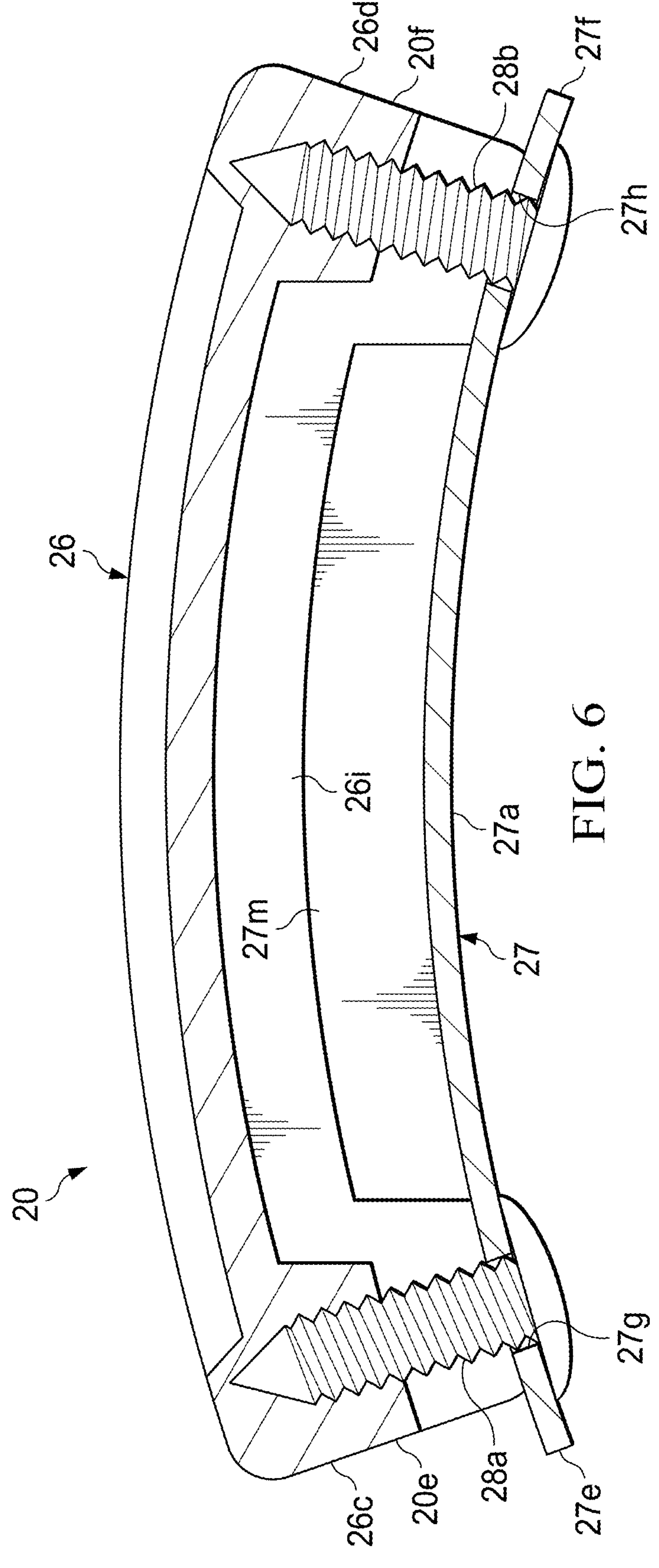
FIG. 6 is a sectional view of the identification tag taken along line 6-6 of FIG. 3.

FIG. 6 is a top, down sectional view along line 6-6 in FIG. 3. The identification tag 20 is shown assembled but without belt 18 in place. However, it is to be understood that the belt 18 will extend through channels 26*n*. It is seen that first screw 28*a* passes through aperture 27*g* of back piece 27 and threads into aperture 26*p* of front piece 26. Similarly, screw 28*b* passes through aperture 27*h* of back piece 27 and threads into aperture 26*q* of front piece 26. Bottom flange 27 is visible as well as edge pillars 26*e*, 26*f*, and inner face 26*m*. FIG. 6 may be thought of as the configuration of identification tag 20 as it comes from the seller, assembled in its packaging (not shown).

Figure 7:
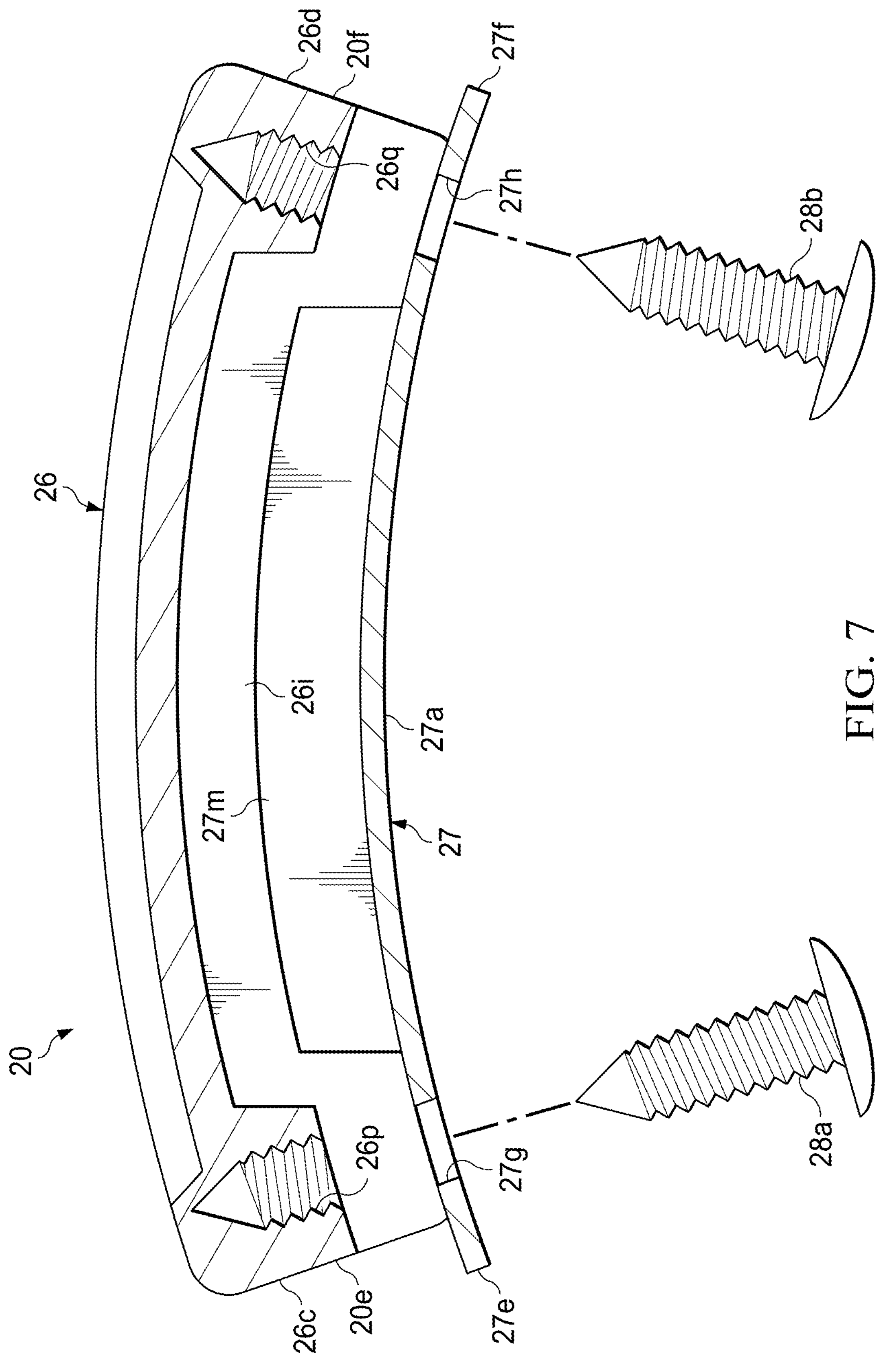
FIG. 7 is a sectional view of FIG. 3 with screws of the identification tag being removed.

FIG. 7 is similar to FIG. 6 however screws 28*a* and 28*b* are removed leaving apertures 26*p* and 26*q* in front face 26 and apertures 27*g* and 27*h* in back face 27. To disassemble, screws 28*a* and 28*b* are unscrewed with a tool that can apply torque to loosen the screws, for example a screwdriver or similar tool. FIG. 7 represents the first step of disassembly of identification tag 20 after removing it from its packaging.

Figure 8:
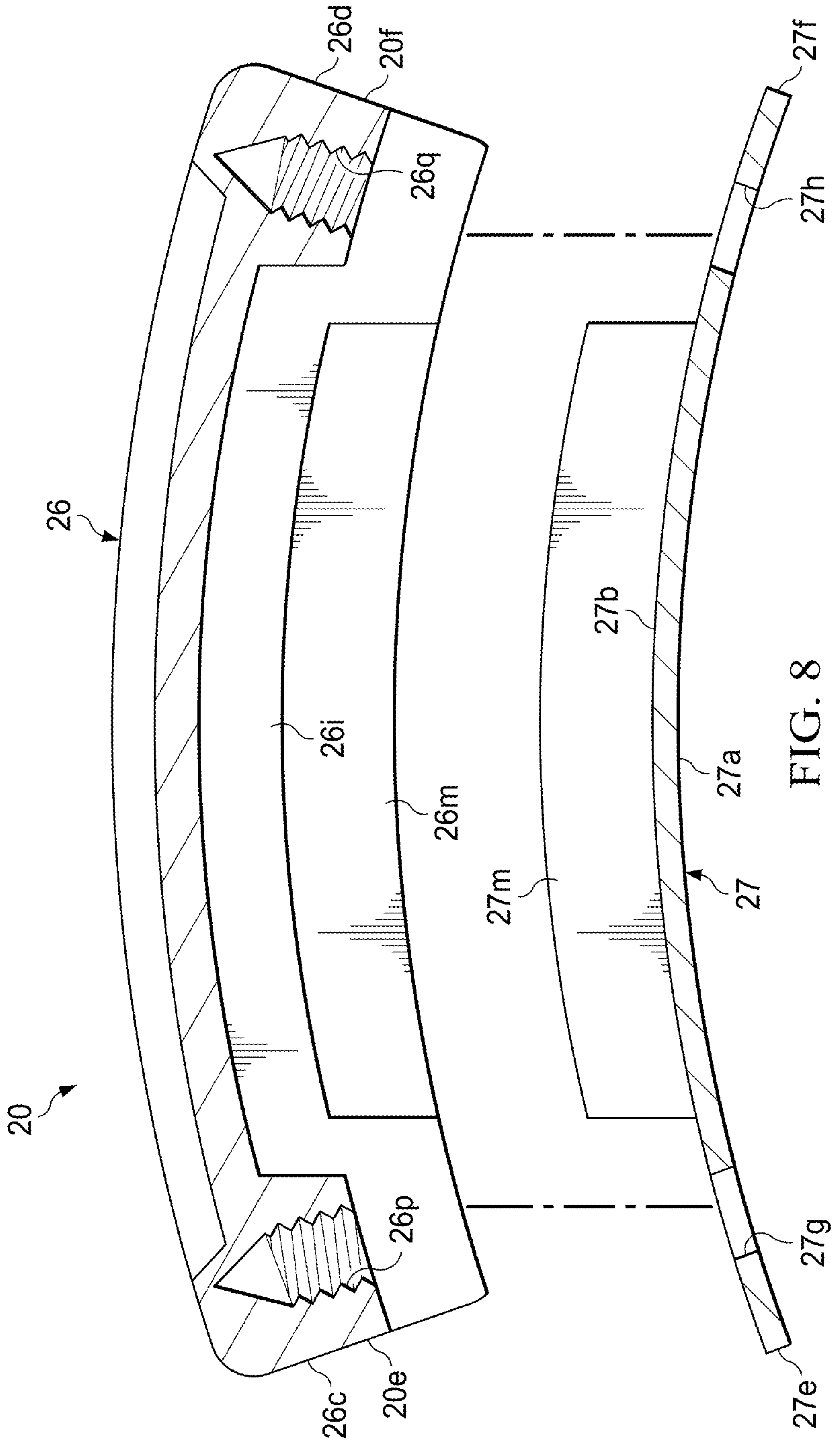
FIG. 8 is a sectional view of FIG. 3 with a rear plate of the identification tag being separated from a front plate of the identification tag.

FIG. 8 is similar to FIG. 7 however both screws 28*a* and 28*b* as well as back piece 27 are removed leaving apertures 26*p* and 26*q* in front face 26 and apertures 27*g* and 27*h* in back face 27. FIG. 8 represents the second step of disassembly of identification tag 20 after removing it from its packaging.

Figure 9:
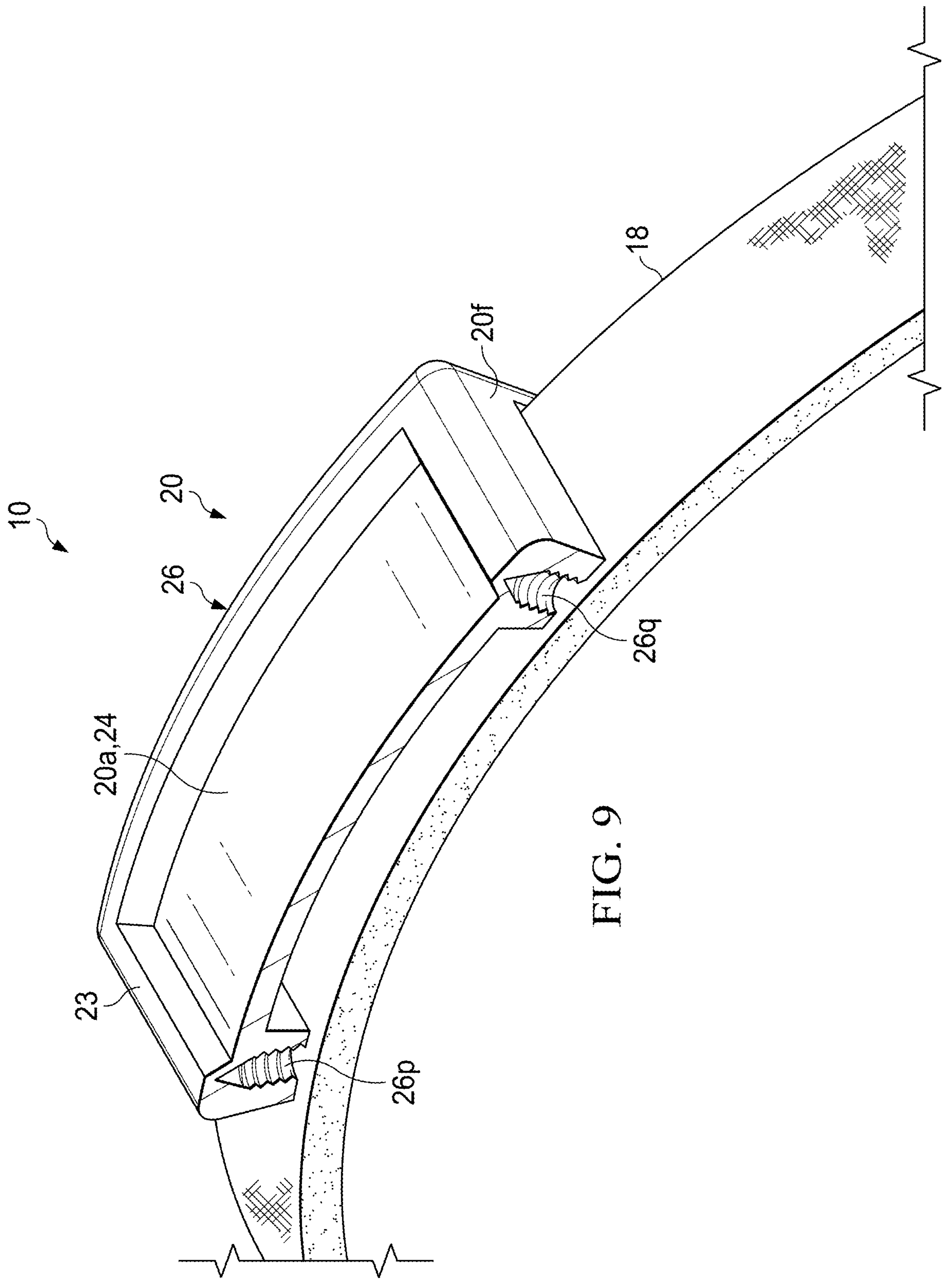
FIG. 9 is a sectional view of FIG. 2 taken along line 9-9 of FIG. 2.

FIG. 9 represents the first step of installing a belt 18 to identification tag 20. FIG. 9 is a top, left elevation of a sectional view of front face of belt 18 and identification tag 20 taken along line 9-9 of FIG. 2. Front face 26 is laid along belt 18 with front face 20*a* facing away from belt 18. In one embodiment, belt 18 has a width 18*w* that corresponds to the height of channels 26*n*, shown in FIG. 5. At this stage, apertures 26*p* and 26*q* are free from engaging with screws 28*a*, 28*b*.

Figure 10:
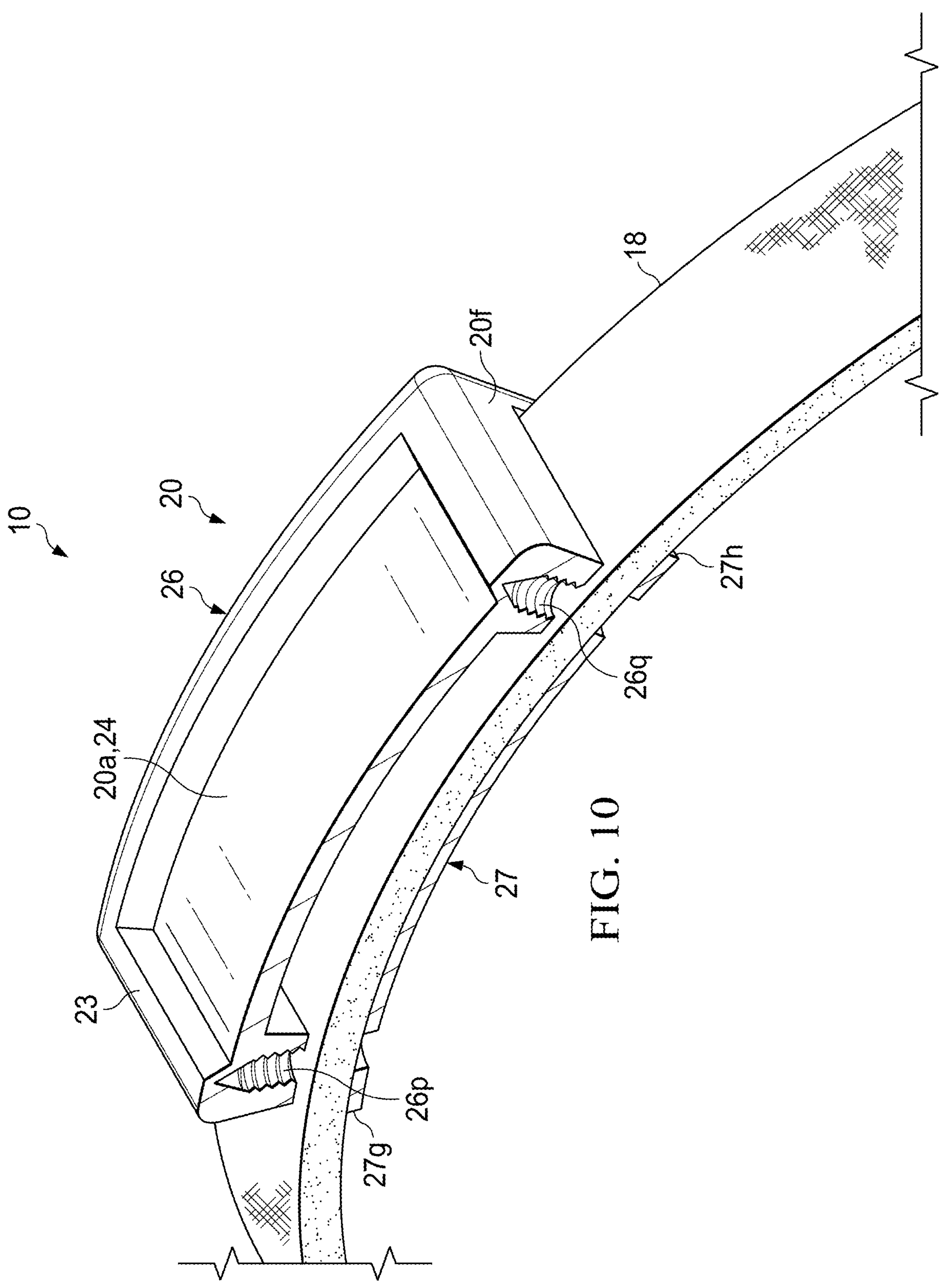
FIG. 10 is a sectional view similar to FIG. 9 with the rear plate being added to the belt and aligned with the front plate.

FIG. 10 represents the second step of installing identification tag 20 to belt 18. FIG. 10 is similar to FIG. 9 however with the addition of back piece 27 being laid across belt 18 opposite front face 26. While belt 18 is, at this stage, solid (that is, not cut or perforated), the next step in assembling collar 10 is to place back piece 27 and front face 26 along belt 18 so that aperture 27*g* is in registry with aperture 26*p*, and aperture 27*h* is in registry with aperture 26*q*.

Figure 11:
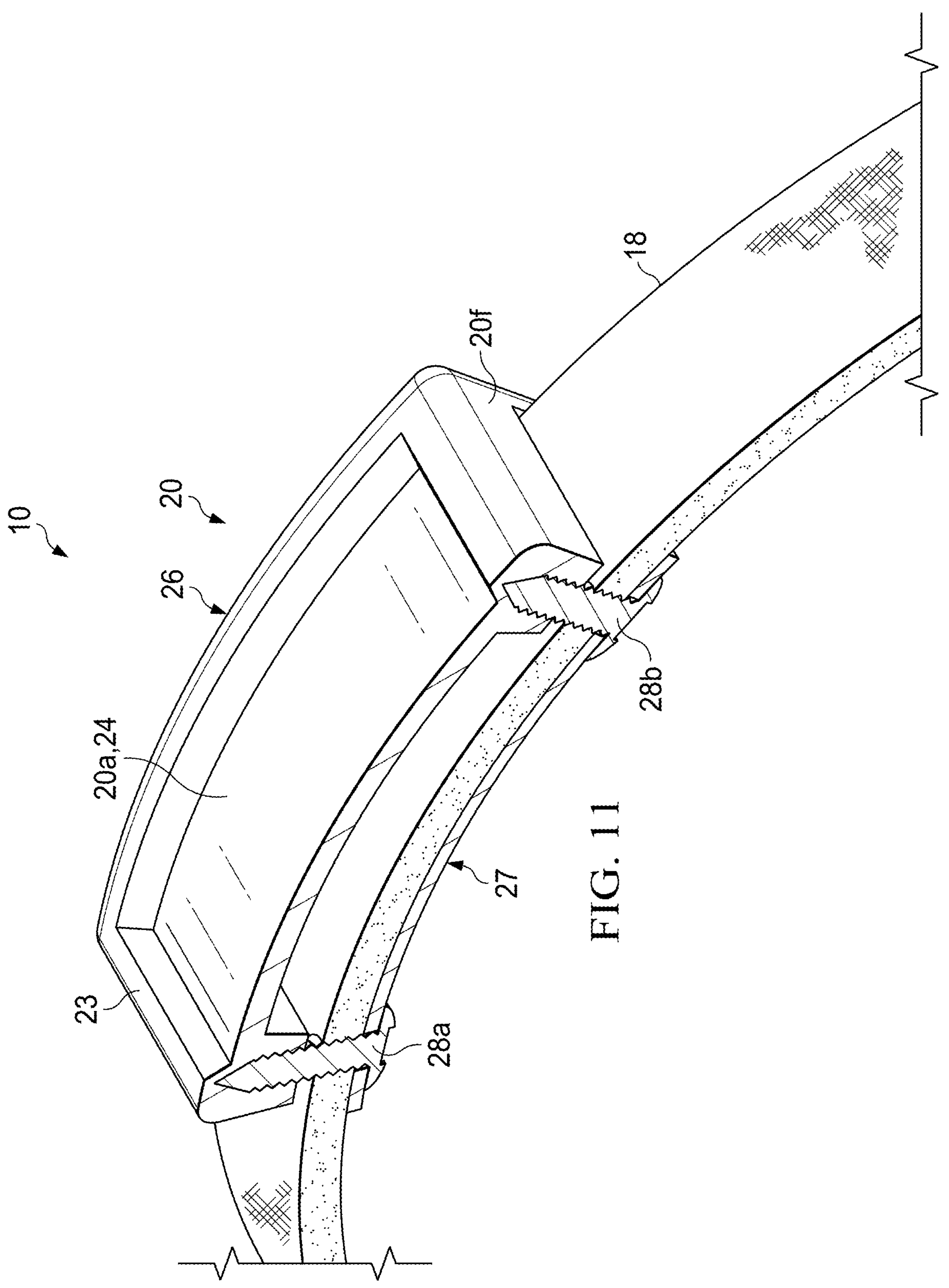
FIG. 11 is a sectional view similar to FIG. 10 with the screws piercing the belt and securing the rear plate with the front plate with one another while encapsulating a portion of the belt.

FIG. 11 represents the third step of installing identification tag 20 to belt 18. FIG. 11 is similar to FIG. 10 however with the addition of screws 28*a* and 28*b* being screwed through and into apertures 27*g* and 27*h*, then through belt 18 in locations in registry with apertures 27*g* and 27*h*, finally, into apertures 26*p* and 26*q*, which are also in registry with apertures 27*g* and 27*h*. To assemble, screws 28*a* and 28*b* are screwed in with a tool that can apply torque to tighten the screws, for example a screwdriver. At this point, collar 10 is fully assembled and ready for use on animal 1.

Identification tag 20 may be so configured (not shown) as to allow the installation of a tracking device (not shown) between front piece 26 and back piece 27, or otherwise attached to belt 18, for example an Apple@ AirTag®, in order to track the location of animal 1. It will be appreciated that myriad similar tracking devices available from various manufacturers and/or distributors could take the place of an Apple® AirTag®. In some embodiments, a tracking device may have an associated computer program or smartphone application "App" (not shown) on which the location of animal 1 can be tracked with tracking device.

Figure 12:
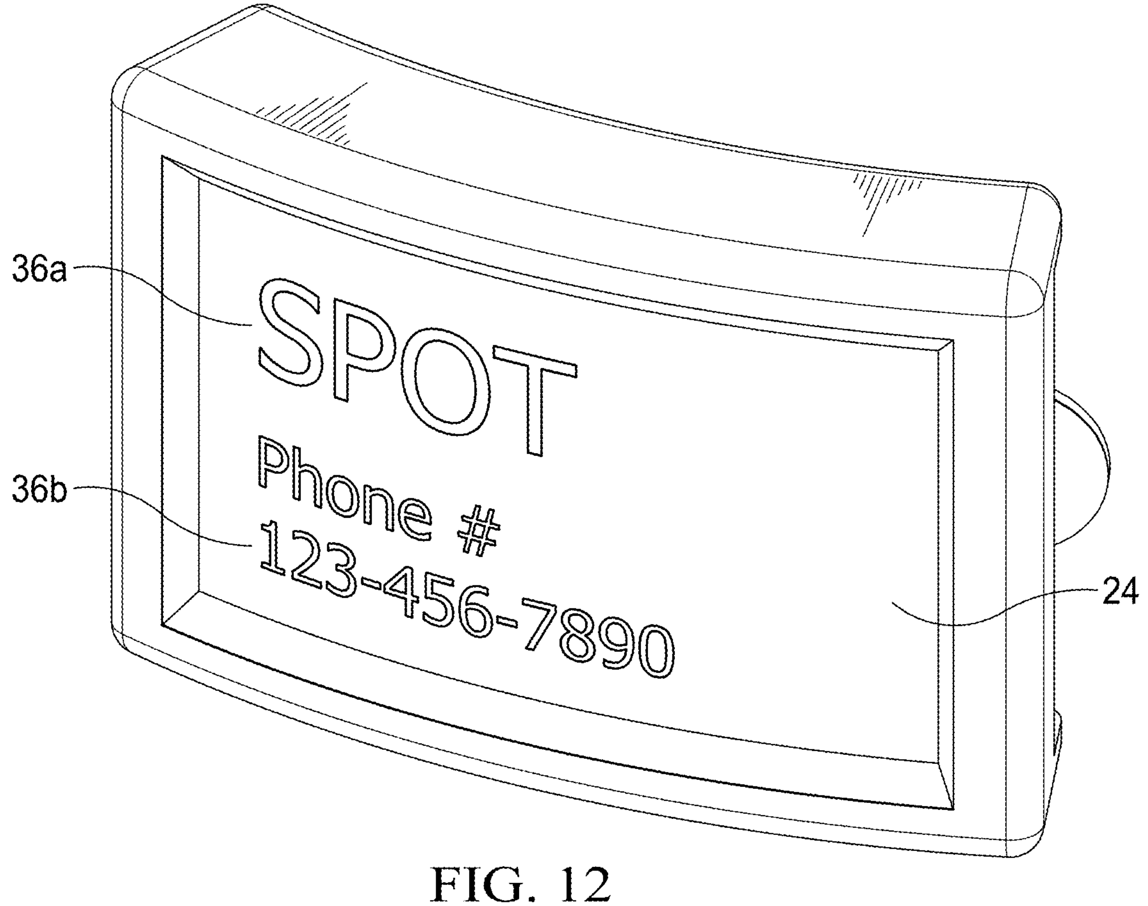
FIG. 12 is a front elevation of an identification tag of the disclosure bearing an engraving of information relating to an animal.
Figure 13:
FIG. 13 is a front elevation of an identification tag of the disclosure bearing an engraving of information relating to an animal.

Identification tag 20 may be engraved on a face thereof, with words, numbers or other symbols. For example, front face 26, (in particular, sight 24) or back piece 27 or both may be so engraved. In one embodiment, sight 24 will be engraved. Identification tag 20 comes from the factory with sight 24 being smooth (As seen in FIGS. 2 and 3) in order to receive indications 36 such as engravings. In various embodiments, the dimensions of sight 24 may be, for example, 1"×1"; 1"×2"; 1"×3"; 1.5"×2"; 1.5"×3"; 2"×2"; or other sizes. Sight 24 has sufficient area on which to engrave several letters and/or numbers (generally indications 36). Such letters and/or numbers may contain, in various embodiments, the name of the animal, the address and/or phone number of the animal's owner or any other information deemed useful by the owner of animal 1. For example, FIG. 12 depicts an animal's name (Spot), 36*a*, and the phone number 36*b* of Spot's owner (123-456-7890). FIG. 13 shows an animal's name (Fluffy), 36*c*, and a message 36*d* indicating that Fluffy needs medicine twice per day and the owner's phone number, 36*e*.

Unless explicitly stated that a particular shape or configuration of a component is mandatory, any of the elements, components, or structures discussed herein may take the form of any shape. Thus, although the figures depict the various elements, components, or structures of the present disclosure according to one or more exemplary embodiments, it is to be understood that any other geometric configuration of that element, component, or structure is entirely possible.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms “upwardly”, “downwardly”, “vertical”, “horizontal”, “lateral”, “transverse”, “longitudinal”, and the like are used herein for the purpose of explanation only unless specifically indicated otherwise.

Although the terms “first” and “second” may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present disclosure.

An embodiment is an implementation or example of the present disclosure. Reference in the specification to “an embodiment,” “one embodiment,” “some embodiments,” “one particular embodiment,” “an exemplary embodiment,” or “other embodiments,” or the like, means that a particular feature, structure, or characteristic described in connection with the embodiments is included in at least some embodiments, but not necessarily all embodiments, of the invention. The various appearances “an embodiment,” “one embodiment,” “some embodiments,” “one particular embodiment,” “an exemplary embodiment,” or “other embodiments,” or the like, are not necessarily all referring to the same embodiments. Furthermore, the use of any and all examples or exemplary language (“e.g.,” “such as,” or the like) is intended merely to better illustrate or illuminate the embodiments and does not pose a limitation on the scope of that or those embodiments. No language in this specification should be construed as indicating any unclaimed element as essential to the practice of the disclosed embodiment.

If this specification states a component, feature, structure, or characteristic “may”, “might”, or “could” be included, that particular component, feature, structure, or characteristic is not required to be included. If the specification or claim refers to “a” or “an” element, that does not mean there is only one of the element. If the specification or claims refer to “an additional” element or “another” element, that does not preclude there being more than one of the additional element or the another element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A collar apparatus comprising:
a belt;
an identification tag selectively operatively engageable with the belt anywhere along a length of the belt, the identification tag comprising:
an outer plate that engages with an outer face of the belt;
wherein the outer plate defines at least one notch;
an inner plate that engages with an inner face of the belt;
wherein the inner plate defines at least one flange, which is complementary in size and shape to the at least one notch defined by the outer plate;
wherein a portion of the at least one flange is received within the at least one notch;
at least one connector configured to secure the outer plate and the inner plate to one another;
wherein the identification tag encapsulates at least a portion of the belt; and
wherein the at least one connector extends through the belt.

2. The collar apparatus of claim 1, wherein the identification tag comprises a sight on which markings can be made on an outward face thereof.

3. The collar apparatus of claim 2, wherein the identification tag comprises markings on the sight.

4. The collar apparatus of claim 1, wherein when the at least one connector secure the outer plate and the inner plate to one another a channel is defined therein and portion of the belt is at least partially received within the channel.

5. The collar apparatus of claim 1, wherein a top end of the outer plate defines the topmost portion of the identification tag and a bottom end of the outer plate defines the bottommost portion of the identification tag.

6. The collar apparatus of claim 1, wherein the outer plate and the inner plate are both curved.

7. The collar apparatus of claim 1, wherein the outer plate further defines a second notch, wherein the first notch is located proximate a top of the outer plate and the second notch is located at a bottom of the outer plate.

8. The collar apparatus of claim 1, wherein the inner plate further defines a second flange, wherein the first flange is located proximate a top of the inner plate and
the second flange is located at a bottom of the inner plate.

* * * * *